(12) United States Patent
Xu

(10) Patent No.: US 11,889,010 B2
(45) Date of Patent: Jan. 30, 2024

(54) APPARATUS AND METHOD FOR GENERATING CONTACT RECOMMENDATIONS

(71) Applicant: JAGUAR LAND ROVER LIMITED, Coventry (GB)

(72) Inventor: Zhou Xu, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 1046 days.

(21) Appl. No.: 16/631,137

(22) PCT Filed: Jul. 18, 2018

(86) PCT No.: PCT/EP2018/069470
§ 371 (c)(1),
(2) Date: Jan. 14, 2020

(87) PCT Pub. No.: WO2019/016250
PCT Pub. Date: Jan. 24, 2019

(65) Prior Publication Data
US 2023/0336653 A1    Oct. 19, 2023

(30) Foreign Application Priority Data
Jul. 21, 2017   (GB) ..................................... 1711729

(51) Int. Cl.
*H04M 1/60*    (2006.01)
*H04M 1/27453*    (2020.01)

(52) U.S. Cl.
CPC ..... *H04M 1/6075* (2013.01); *H04M 1/27453* (2020.01)

(58) Field of Classification Search
CPC ........................ H04M 1/6075; H04M 1/27453
See application file for complete search history.

(56) References Cited

U.S. PATENT DOCUMENTS

| 9,614,950 B1* | 4/2017 | Stevanovic | ........... H04L 67/306 |
| 2006/0035632 A1* | 2/2006 | Sorvari | ............... H04M 1/7243 455/418 |

(Continued)

FOREIGN PATENT DOCUMENTS

| CN | 106850921 A | 6/2017 |
| CN | 106850921 A | 6/2017 |

(Continued)

OTHER PUBLICATIONS

International Search Report and Written Opinion, PCT/EP2018/069470, dated Oct. 19, 2018, 13 pages.

(Continued)

*Primary Examiner* — Ankur Jain
(74) *Attorney, Agent, or Firm* — McCoy Russell LLP

(57) ABSTRACT

Embodiments of the present invention provide a computer-implemented method of generating contact recommendations for a vehicle communication apparatus, comprising determining (110) a plurality of vehicle contact events associated with a communication device, determining (120) a distance between one or more current parameters and one or more parameters associated with each of the vehicle contact events, and generating (130) one or more contact recommendations according to the distance.

19 Claims, 4 Drawing Sheets

(56) References Cited

U.S. PATENT DOCUMENTS

2006/0085415 A1* 4/2006 Jian .................. G06F 16/81
707/999.005
2010/0330972 A1* 12/2010 Angiolillo .......... H04M 1/2746
455/418

FOREIGN PATENT DOCUMENTS

| GB | 2528088 A | 12/2010 |
| JP | 2003188979 A | 7/2003 |
| JP | 2008510406 A | 4/2008 |
| JP | 2011072007 A | 4/2011 |
| JP | 2013042537 A | 2/2013 |

OTHER PUBLICATIONS

Japan Patent Office, Office Action Issued in Application No. 2020-502606, dated Apr. 27, 2021, 4 pages.
State Intellectual Property Office of the People's Republic of China, Office Action Issued in Application No. 201880045917.X, dated Nov. 11, 2021, 23 pages.

* cited by examiner

APPARATUS AND METHOD FOR GENERATING CONTACT RECOMMENDATIONS

CROSS-REFERENCE TO RELATED APPLICATIONS

This application is a 371 of International Application No. PCT/EP2018/, filed Jul. 18, 2018, which claims priority to GB Patent Application 1711729.2, filed Jul. 21, 2017, the contents of both of which are incorporated by reference herein in their entirety.

TECHNICAL FIELD

The present disclosure relates to an apparatus and method for generating contact recommendations. Aspects of the invention relate to a communication apparatus and method for generating contact recommendations, in particular, but not exclusively, to an apparatus, a vehicle, a method for use in a vehicle for recommending contacts to an occupant of the vehicle, and computer software.

BACKGROUND

Vehicles often provide a communication capability for occupants of the vehicle. The communication capability may allow an occupant of the vehicle to make a voice or possibly a video call via a telecommunications network. To provide this capability the vehicle may include an apparatus for communicably coupling with a user's communication device, such as mobile telephone, in order to make and receive calls or the vehicle includes a communication unit capable of communicating with the telecommunications network. Both may be referred to as a 'hands-free' system of the vehicle.

When a user wishes to make a call, they are able to access a contact list or phonebook which stores details of the user's contacts e.g. friends, family etc. The contact list may be searched by the user. However in a high cognitive load environment, such as for a driver of the vehicle, searching the contact list to find a desired contact is undesirable.

It is an object of embodiments of the invention to recommend one or more contacts to a user with whom user wishes to communicate. It is an object of embodiments of the invention to determine one or more contact recommendations without a significant processing requirement. It is an object of embodiments of the invention to at least mitigate one or more of the problems of the prior art.

SUMMARY OF THE INVENTION

Aspects and embodiments of the invention provide a computer-implemented method of generating contact recommendations, a communication apparatus, computer software and a vehicle as claimed in the appended claims.

According to an aspect of the invention there is provided a computer-implemented method of generating contact recommendations, comprising determining a distance to a contact event and generating contact recommendations according to the distance.

According to an aspect of the invention there is provided a computer-implemented method of generating contact recommendations, comprising determining a distance between one or more current parameters and one or more respective parameters associated with a contact event and generating contact recommendations according to the distance. Advantageously, contact recommendations are generated based upon a similarity to each respective contact event. The distance may be determined to each of a plurality of contact events and the contact recommendations selected based thereon.

In an embodiment the method is a method of providing contact recommendations for a vehicle communication apparatus.

A contact event may be understood to mean a communication event with the respective contact. A contact event may be a telephone or video call with the respective contact, text message communication with the contact, or an email sent to or received from the contact. In some embodiments, contact events are understood to mean calls, audio or video, made with the contact. Contact events may be vehicle contact events. Vehicle contact events are those contact events that were executed via the vehicle communication apparatus.

The method may comprise determining a plurality of vehicle contact events, wherein vehicle contact events are contact events that were executed via the vehicle communication apparatus. In this way, contact recommendations for contact events taking place in the vehicle are based on previous contact events made from the vehicle, thus providing improved recommendations.

The method may be suitable for use in a high cognitive load environment, for example while driving a vehicle.

Optionally, at least some of the parameters are temporal parameters. Advantageously, the similarity is determined at least in part on a time associated with the contact event.

Current parameters may be one or more characteristics of a current point in time, such as a current day or a current time.

The distance may be indicative of a difference between the one or more current parameters and the one or more parameters associated with each of the contact events. Advantageously parameters with a smaller distance are those most similar to a current situation.

Optionally, the distance may be based upon the difference squared. The distance may be based upon the difference between a plurality of current parameters and a plurality of parameters associated with each of the contact events. The distance may be based upon a sum-squared difference between the plurality of current parameters and the plurality of parameters associated with each of the contact events. Advantageously a plurality of parameters are taken into account when determining the difference between the current parameters and parameters associated with each of the contact events, thereby providing improved contact recommendations.

The distance may be calculated based upon a weighted combination of the plurality of current parameters and the plurality of parameters associated with each of the contact events. In this way, the importance of certain parameters may be adjusted dependent on the requirements of different markets or users.

A value may be associated with each of the current parameters and the parameters associated with each of the contact events, wherein the value may be determined by allocating the respective parameter to one or more groups. Advantageously this allows non-numeric parameters to be used in determining the distance.

Optionally, each of the groups corresponds to one or more parameter values, wherein the group for at least some of the parameters may correspond to a period of time, or one or more days of the week. Advantageously the period of time and day of week parameters associated with each of the contact may be taken into account when determining contact recommendations. Optionally the groups consist of a first group for days of the week and a second group for time of day. Advantageously the determination of distance is made relatively straightforward to calculate.

Advantageously, the distance may be calculated according to the following expressions:

if abs($x-y$)≤max_distance, then distance=abs ($x-y$);

if abs($x-y$)>max_distance, then distance=$n$-abs($x-y$);

where x is a first parameter value for a first event, y is the first parameter value for a second event, n is the total number of groups for the first parameter, the abs( ) function returns the absolute value, and where max_distance is the maximum permitted distance between event parameters being defined by the equation:

max_distance=Floor(max_difference/2).

where max_difference is the difference between the largest possible value of group numeric value and smallest possible value of group numeric value, and the Floor( ) function returns the least succeeding integer.

Optionally, generating contact recommendations comprises generating up to a predetermined number of contact recommendations, wherein the predetermined number may be up to five; optionally the predetermined number may be three. Advantageously a concise number of recommendations may be provided. Advantageously this may be useful in high cognitive load environments, such as to a driver of a vehicle.

Optionally the method comprises selecting a contact event from amongst a plurality of contact events having substantially equal distance based on a discriminating parameter associated with the respective contact events. The discriminating parameter may be a total number of contact events associated with a respective contact ID.

The one or more contact recommendations may be output to a user, wherein the generating may comprise generating a plurality of contact recommendations and the outputting may comprise outputting the plurality of recommendations in an order based upon the distance. Advantageously, most similar recommendations are output first to the user.

Optionally, generating one or more contact recommendations comprises generating a first set of vehicle contact recommendations based on a first subset of the determined vehicle contact events and a second set of contact recommendations based on a second subset of vehicle contact events; and comparing the first and second set of contact recommendations. In this way, recommendations may be optimised to consider the stability of the user's calling patterns, such that a user with a changeable calling pattern will have recommendations derived from a smaller, more recent, set of vehicle contact events.

The first subset may comprise all of the determined vehicle contact events. Further, the second subset comprises only recent determined vehicle contact events. In this way, the method may provide a comparison of recommendations generated over the full set of available vehicle contact events against those generated over a subset of more recent data.

According to another aspect of the invention, there is provided a communication apparatus, comprising memory means for operably storing data indicative of a plurality of contact events; control means; and an input-output (IO) means. The control means is arranged to determine a distance between one or more current parameters and one or more respective parameters associated with each of the contact events; and generate contact recommendations according to the distance and to output the recommendations via the IO means to a user.

The communication apparatus may be a vehicle communication apparatus, suitable for providing communication functionality in a vehicle.

In an embodiment, the memory means is for operably storing data indicative of a plurality of vehicle contact events, where vehicle contact events are those contact events that were executed through the vehicle communication apparatus.

The communication apparatus may be adapted for use in a high cognitive load environment, such as a vehicle.

Optionally at least some of the parameters are temporal parameters.

The distance may be indicative of a difference between the one or more current parameters and the one or more parameters associated with each of the contact events, and the distance may be based upon the difference squared.

Optionally, the distance is based upon the difference between a plurality of current parameters and a plurality of parameters associated with each of the contact events. The distance may be based upon a sum-squared difference between the plurality of current parameters and the plurality of parameters associated with each of the contact events. Advantageously a plurality of parameters may be taken into account when determining the difference between the current parameters and parameters associated with each of the contact events, thereby providing more accurate contact recommendations.

The control means may be arranged to determine a value associated with each of the current parameters and the parameters associated with each of the contact events, wherein the value may be determined by allocating the respective parameter to one or more groups, wherein each of the groups corresponds to one or more parameter values. The group for at least some of the parameters may correspond to a period of time, or to one or more days of the week.

The distance may be determined according to:

$$D = \sum_{i}^{I} (\text{Current}_i - \text{Event}_i)^2$$

wherein D is the distance, I is a total number of parameters, i is an parameter number between 1 and I, Current$_i$ is an ith current parameter, and Event$_i$ is an ith parameter associated with a contact event. The distance calculation enables current parameters and contact event parameters to be compared directly to provide a more accurate distance.

Optionally, the communication apparatus may be adapted to generate contact recommendations up to a predetermined number of contact recommendations, wherein the predetermined number may be up to five; optionally the predetermined number may be three. Advantageously a concise number of recommendations may be provided. This may be useful in high cognitive load environments, such as to a driver of a vehicle.

Optionally, the communication apparatus comprises a communication means for wireless communication with a mobile device, wherein the data indicative of the plurality of contact events is received from the mobile device. Advantageously, the communication apparatus may operate in combination with a mobile device to obtain the contact information upon which recommended contacts may be determined.

The IO means may comprise a display means for displaying the contact recommendations. Advantageously, a graphical user-interface may provide the contact recommendations.

According to an aspect of the invention there is provided a computer-implemented method of generating contact recommendations, comprising determining a distance between a current day and time of day and a data and time of day of each of a plurality of contact events and generating a contact recommendations according to the distance. Advantageously, contact recommendations are generated based upon a similarity to each respective contact event.

According to an aspect of the invention there is provided a computer-implemented method of generating contact recommendations, comprising determining a distance as:

$$D=(Day_{current}-Day_{event})^2+(Time_{current}-Time_{event})^2$$

wherein D is the distance, $Day_{current}$ is a current day, $Day_{event}$ is a day of a contact event, $Time_{current}$ is a current time of day, $Time_{event}$ is a time of a contact event, and generating a contact recommendations according to the distance. Advantageously, contact recommendations are generated based upon a similarity to each respective contact event.

According to yet another aspect of the invention, there is provided a vehicle comprising a communication apparatus according to an aspect of the invention. Advantageously contact recommendations may be provided to one or more occupants of the vehicle. Advantageously the one or more occupants may include the driver of the vehicle.

According to a further aspect of the invention, there is provided computer software which, when executed by a computer, is arranged to perform a method according to an aspect of the invention, wherein the computer software may be stored on a computer readable medium.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
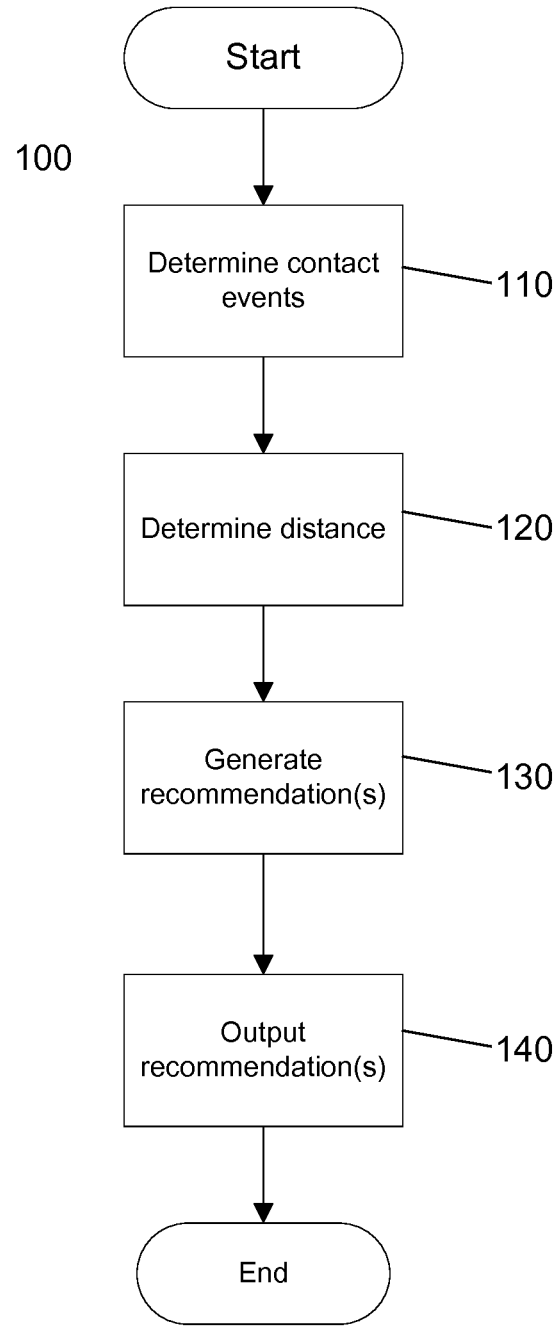
FIG. 1 shows a method according to an embodiment of the invention.

FIG. 1 illustrates a method 100 of generating contact recommendations according to an embodiment of the invention. The method 100 provides one or more recommended contacts to a user. The method 100 may provide up to a predetermined number of contacts. In some embodiments the predetermined number is relatively small, such that the recommend contacts are most relevant to the user i.e. it is most likely that the user wishes to contact one of the contacts from the set of recommended contacts and the user is able to select one of the contacts from the set without undue distraction, such as whilst in a high cognitive load environment, for example driving a vehicle.

Figure 2:
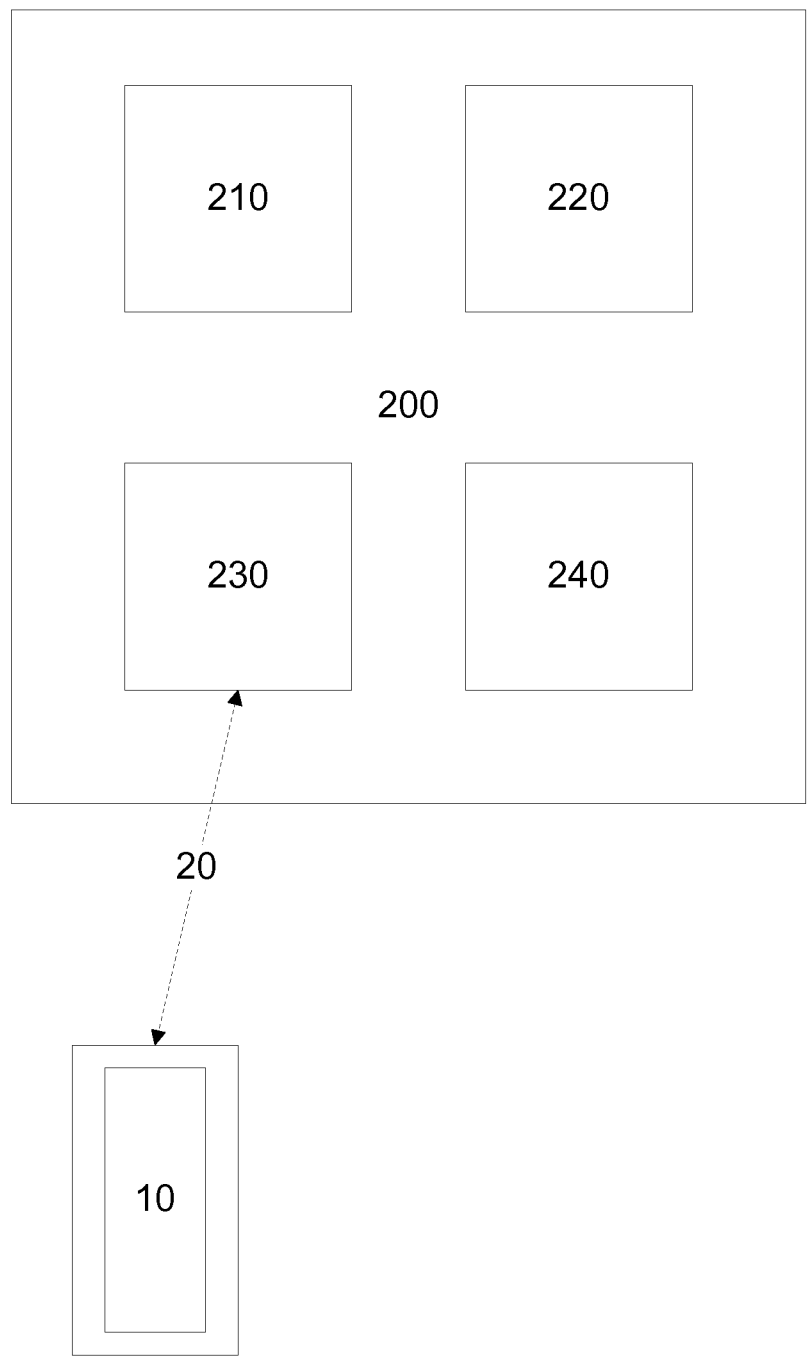
FIG. 2 shows an apparatus according to an embodiment of the invention.

The method 100 as shown in FIG. 1 will be described with reference to FIG. 2, which illustrates an apparatus 200 according to an embodiment of the invention.

The apparatus 200 is a communication apparatus. The communication apparatus 200 may be arranged for communicating with a mobile device 10, such as a mobile telephone or portable communication device such as a tablet computer, although it will be realised that this list is not exhaustive and is merely illustrative. The communication apparatus 200 may be arranged within a vehicle. The communication apparatus 200 may be a hands-free apparatus for allowing use of the mobile telephone in the vehicle. In this respect the apparatus may form part of a user-interface of the vehicle, such as part of an infotainment system of the vehicle. In other embodiments the communication apparatus may be capable of communicating with a wireless telecommunication network itself, such forming a mobile telephone.

The communication apparatus 200 comprises a control means 210 in the form of one or more processing devices for executing software instructions, a memory means 220 for operably storing data formed by one or more memory devices, a communication means 230 in the form of a communication device for wireless communication, and an input-output (IO) means 240 formed by one or more IO devices. The communication device 230 is provided for wireless communication 20 which, in some embodiments, is with the mobile device 10 e.g. the mobile telephone or portable communication device (hereinafter collectively referred to as mobile phone 10). The IO device 240 is provided for inputting or outputting data from/to the user. The IO device 240 may be arranged to output data to the user, such as visibly or audibly, and to receive an input from the user. For example, the IO device 240 may comprise a display device for visibly displaying data thereon. The IO device 240 may further comprise an input device for receiving the user input, wherein the input device may be a touch-sensitive portion of the display device. In use the display device may be controlled by the processing device 210 to display one or more contact recommendations thereon, as will be explained. It will be realised that in some embodiments the one or more contact recommendations may be audibly output by the IO device 240.

The communication device 230 is arranged to communicate 20 with the mobile phone to determine contact events as in step 110 of FIG. 1.

The mobile phone 10 is associated with contact data indicative of a plurality of contacts. Each contact in the contact data comprises a contact ID, such as a name or other identifying information, and one or more unique items of contact information by which the contact can be reached, such as a telephone number, email address, social media identifier, etc. The contact data may be stored in a memory of the mobile phone 10 or in a memory accessible to the mobile phone 10, i.e. at a remote storage location sometimes referred to as 'cloud storage'. The term contact event is intended to mean a communication event with the respective contact. For example, a contact event may be understood to broadly comprise a telephone or video call with the respective contact, text message communication with the contact, or an email sent to or received from the contact. However, in some embodiments, contact events are understood to mean calls, audio or video, made with the contact from the mobile phone 10. In some embodiments the contact events used to determine the contact recommendations are only those made from the mobile phone 10 to the respective contact. Vehicle contact events are those contact events which are executed via the communication apparatus 200 of the vehicle.

Data indicative of the contact events is obtained by the apparatus 200 receiving 20 the data from the mobile phone 10 via the communication device 230. The data may comprise data indicative of the contact, such as the contact ID, and temporal information relating to the contact event, i.e. indicative of a time and date of the call to the contact. The data indicative of the contact events may be obtained for a predetermined period of time prior to a current time. For example, the data may be obtained for a previous seven days, one month or other time period, although it will be realised that these time periods are merely illustrative. Alternatively, a predetermined number of the most recent contact events may be obtained, for example, depending on the memory available in the communication apparatus 200. Thus, based on the received data, the processing device 210 of the apparatus 200 is provided with data indicative of with whom and when calls were made by the user of the mobile phone 10. The received data may be stored in the memory device 220 of the apparatus 200.

In an alternative arrangement, the communication apparatus 200 monitors the status of a mobile phone 10 while they are in communication. In this way, the communication apparatus is aware 200 of contact events that occur while the mobile phone 10 is in communication with the communication apparatus 200. Typically, such contact events occur via the communication apparatus 200, for example with the communication apparatus providing a hands-free option for calls. By monitoring in this way, the communication apparatus is able to establish those contact events that occurred via the communication apparatus.

In step 120 a distance is determined to each of the contact events determined in step 110. The distance is determined based upon one or more current parameters and one or more respective parameters associated with each of the contact events. Current parameters are understood to mean characteristics of a current point in time, such as a current day or a current time. The distance is indicative of a difference between the one or more current parameters and the one or more parameters associated with each of the contact events. In some embodiments at least some of the parameters are temporal parameters. The total distance may be considered as a sum-squared distance between a plurality of parameters as in the following Equation 1:

$$D = \sum_i^I d_i^2 \quad \text{Equation 1}$$

wherein D is the total distance, I is a total number of parameters, i is a parameter number between 1 and I, and $d_i$ is the ith parameter distance associated with a contact event.

In some embodiments, the parameter distance may be determined as a difference between parameters, such that Equation 1 becomes:

$$D = \sum_i^I (\text{Current}_i - \text{Event}_i)^2 \quad \text{Equation 2}$$

wherein D is a total distance, I is a total number of parameters, i is a parameter number between 1 and I, $\text{Current}_i$ is an ith current parameter, and $\text{Event}_i$ is an ith parameter associated with a contact event. The distance calculation enables current parameters and contact event parameters to be compared directly to provide a more accurate distance. For example, a first I=1 parameter may be a current day and a day of the respective contact event where each day of the week is assigned a respective numeric value. Similarly, a second i=2 parameter may be a current time and a time of the respective contact event. Advantageously, by using a calculation of this form significant computational overhead is avoided. In other words, it is not necessary to employ a computationally expensive method such as using Bayesian mathematics.

Alternatively, the total distance D may be determined as a weighted sum-squared distance between a plurality of weighted parameters as in the following Equation 3:

$$D = \sum_i^I w_i (d_i)^2 \quad \text{Equation 3}$$

wherein D is the total distance, I is a total number of parameters, i is a parameter number between 1 and I, $w_i$ is the weight associated with the ith parameter, and $d_i$ is ith parameter distance associated with a contact event.

In some embodiments, the parameter distance may be determined as a difference between parameters, such that equation 3 becomes:

$$D = \sum_i^I w_i (\text{Current}_i - \text{Event}_i)^2 \quad \text{Equation 4}$$

wherein D is the total distance, I is a total number of parameters, i is a parameter number between 1 and I, $w_i$ is the weight associated with the ith parameter, $\text{Current}_i$ is an ith current parameter, and $\text{Event}_i$ is an ith parameter associated with a contact event.

In one embodiment a first current parameter value is a current day and a first parameter associated with the contact event is a day of the respective contact event, and a second current parameter value is a current hour and a second parameter associated with the contact event is an hour of the respective contact event. In some embodiments a third parameter is indicative of a weekend or weekday, i.e. whether the current time is at a weekend and whether the respective contact event was at a weekend.

In some embodiments, at least some of the one or more current parameters and one or more parameters associated with each of the contact events are assigned to a respective group, wherein each group is associated with a respective numeric value or identifier. The assignment to each group is based upon the value of the parameter wherein each group is associated with one or more parameter values. A range of the parameter values associated with the group denotes a width of the respective group.

The first parameter indicative of the day may be assigned to a group wherein each group is associated with a respective Day of Week value. The Day of Week values may be as indicated in the table below, although it will be realised that other values may be used.

The values of Day of Week may be defined as:

| Day of Week | Day of Week |
|---|---|
| Monday | 0 |
| Tuesday | 1 |
| Wednesday | 2 |
| Thursday | 3 |
| Friday | 4 |
| Saturday | 5 |
| Sunday | 6 |

Whilst the above table indicates that each day of the week is assigned a respective Day of Week value, it will be appreciated that the width of each group may be increased to include a plurality of days. For example, one group may include Monday and Tuesday and be associated with a Day of Week value of 0, although it will be realised that this is merely an example.

The second parameter indicative of the time may be assigned to a group wherein each group is associated with a respective Hour ID value. The Hour ID values may be as indicated in the table below, although it will be realised that other values may be used.

The values of Hour ID may be defined as:

| Hours of the day | Hour ID |
|---|---|
| 00, 01, 02 | 1 |
| 03, 04, 05 | 2 |
| 06, 07, 08 | 3 |
| 09, 10, 11 | 4 |
| 12, 13, 14 | 5 |
| 15, 16, 17 | 6 |
| 18, 19, 20 | 7 |
| 21, 22, 23 | 8 |

For example, if the time is 08:15:29, the hour number is 8, therefore the Hour ID is determined as 3. Whilst the above table indicates that three hours are assigned to a respective Hour ID value, it will be appreciated that the width of each group may be increased or decreased to include more or fewer hours. For example, one group may include hours 01 and 02 and be associated with an Hour ID value of 0, although it will be realised that this is merely an example. Each group may be assigned with one or a plurality of hours.

As noted above, in some embodiments the third parameter is indicative of a weekend or weekday. The third parameter may be assigned to a group wherein each group is associated with a respective Weekend value. In some embodiments, the Weekend value may be determined from the first parameter representative of the day of the week.

The values of Weekend may be defined as:

| Day of Week | Weekend |
|---|---|
| Monday to Friday | 0 |
| Saturday and Sunday | 1 |

It will be appreciated that the above values of Weekend are merely illustrative. Furthermore it will be appreciated that in some countries the days of the week corresponding to weekend may be different.

The actual distance between the current parameter value and the event parameter value is calculated in a manner that allows for the cyclic nature of periods of time, such as days of the week and hours of the day. If a first event X has a parameter value x for a parameter Q and a second event Y has a parameter value y for a parameter Q, then the actual distance between those events for parameter Q is given by the following expressions:

if $abs(x-y) \leq max\_distance$, then $actual\_distance = abs(x-y)$;

if $abs(x-y) > max\_distance$, then $actual\_distance = n - abs(x-y)$;

where n is the total number of groups for that parameter, the abs( ) function returns the absolute value, and where max_distance is the maximum permitted distance between event parameters being defined by the equation:

$$max\_distance = Floor(max\_difference/2). \quad \text{Equation 5}$$

where max_difference is the difference between the largest possible value of group numeric value and smallest possible value of group numeric value, and the Floor( ) function returns the greatest integer less than or equal to the input parameter.

For example, for the Day of Week group values shown earlier, the largest possible value of group numeric value is 6 and the smallest possible value of group numeric value is 0. Therefore, the max_difference is 6-0, i.e. 6.

For the Hour ID group values shown earlier, the largest possible value of group numeric value is 8 and the smallest possible value of group numeric value is 1. Therefore the max_difference is 8-1, i.e. 7.

So for these example values, the max_distance for Day of Week is equal to Floor(6/2), which is Floor(3), i.e. 3. For the example Hour ID values, the max_distance is equal to Floor(7/2), i.e. 3. The person skilled in the art will understand that it is not necessary that the max_distance for different parameters be the same.

Considering our example of events X and Y, if event X occurred at 23:00:00 such that x=8; and event Y occurred at 00:00:00 such that y=1, then the actual distance is calculated by first evaluating abs(x-y) as follows:

$abs(x-y) \rightarrow abs(8-1) = 7$.

7 is greater than 3 therefore, we use the following expression to calculate the actual distance:

$actual\_distance = n - abs(x-y)$

As such, the actual_distance=8-abs(8-1), which gives an actual distance of 1. Based on the above values for Day of Week, Hour ID and, in some embodiments, additionally Weekend the value of D may be determined for each contact event.

For example, if the current time is Wednesday 15:15:29, the corresponding current parameter values will be:

[Day of Week, Grouped Hour ID, Weekend]=[2, 6, 0]

For the three exemplary contact events shown in Table 1,

TABLE 1

| Call ID | Dialled number | Week Day | Hour |
|---|---|---|---|
| 1 | +442476000851 | 4 (Friday) | 16 |
| 2 | +442476000242 | 3 (Thursday) | 8 |
| 3 | +442476000224 | 6 (Sunday) | 10 | the following parameters may be determined:

Call 1=[4, 6, 0]

Call 2=[3, 3, 0]

Call 3=[6, 4, 1]

Corresponding distances are determined as follows:

As described previously, the max_difference for the Day of Week parameter is 6-0, that is, max_difference=6. As such, the max_distance is Floor(6/2), that is, max_distance=3. Furthermore, the total number, n, of groups for the Day of Week parameter is 7.

As described previously, the max_difference for the Hour parameter is 8-1, that is, max_difference=7. As such, the max_distance is Floor(7/2), that is, max_distance=3. Furthermore, the total number, n, of groups for the Hour parameter is 8.

Call 1 Distance Calculation

Call 1=[4, 6, 0]

Day of Week

To begin, we evaluate the expressions abs(x−y), which in this case is abs(2−4). As such, the expression has a value of 2, which is less than 3 (i.e. max_distance for Day of Week parameter), therefore actual distance is calculated as follows:

abs(2−4)=2

Grouped Hour ID

To begin, we evaluate the expressions abs(x−y), which in this case abs(6−6). As such, the expression has a value of 0, which is less than 3 (i.e. max_distance for Hour ID parameter), therefore actual distance is calculated as follows:

abs(6−6)=0.

It is not necessary to carry out cyclic calculations for the Weekend parameter.

Therefore the distance calculation is as follows:

$D1 = 2^2 + 0^2 + (0-0)^2 = 4$

Call 2 Distance Calculation

Call 2=[3, 3, 0]

Day of Week

To begin, we evaluate the expressions abs(x−y), which in this case abs(2−3). As such, the expression has a value of 1, which is less than or equal to 3, therefore the actual distance is calculated as follows:

abs(2−3)=1

Grouped Hour ID

To begin, we evaluate the expressions abs(x−y), which in this case abs(6−3). As such, the expression has a value of 3, which is less than or equal to 3, therefore the actual distance is calculated as follows:

abs(6−3)=3

Therefore the distance calculation is as follows:

$D2 = 1^2 + 3^2 + (0-0)^2 = 10$

Call 3 Distance Calculation

Call 3=[6, 4, 1]

Day of Week

To begin, we evaluate the expressions abs(x−y), which in this case abs(2−6). As such, the expression has a value of 4, which is greater than 3, therefore actual distance is calculated as follows:

7−abs(2−6)=3

Grouped Hour ID

To begin, we evaluate the expressions abs(x−y), which in this case abs(6−4). As such, the expression has a value of 2 which is less than or equal to 3, therefore actual distance is calculated as follows:

abs(6−4)=2

Therefore the distance calculation is as follows:

$D3 = 3^2 + 2^2 + (0-1)^2 = 14$

Therefore D1=4, D2=10 and D3=14.

In this case, distance of the current time to Call 1 is smaller relative to Call 2 or Call 3, and therefore will be considered to be closest (less distance) and hence is more 'similar' to the current parameters. In other words, it is determined based on historical contact event data that the user is more likely to call the telephone number of Call 1 (+442476000851). It is noted that Call 1 is two days away from the current day, while Call 2 is only one day away, however the similarity between the current time and the time of Call 1 reduces the overall distance from Call 1.

In another example, weightings are applied. Weightings may be used, for example, to take into account that weekday calling patterns may be different to weekend calling patterns, or that the time of the call may be more or less important than the day of the call. Example weightings may be a weighting value of 1 for the Day of Week parameters; a weighting value of 1.2 for Grouped Hour ID; and a weighting value of 1 for the Weekend parameter. These values emphasise the distance in the time of day (hour group) from a current call in the calculation of the overall distance.

For example, if the current time is Tuesday 01:20:29, the corresponding current parameter values will be:

[Day of Week, Grouped Hour ID, Weekend]=[1, 1, 0]

For the two exemplary contact events shown in Table 2,

TABLE 2

| Call ID | Dialled number | Week Day | Hour |
|---------|----------------|--------------|------|
| 4 | +442476000353 | 2 (Wednesday) | 2 |
| 5 | +442476000044 | 1 (Tuesday) | 3 | the following parameters may be determined:

Call 4=[2, 1, 0]

Call 5=[1, 2, 0]

Corresponding distances are determined as follows:

$$D4 = 1^2 + 0^2 + 0^2 = 1$$

$$D5 = 0^2 + 1^2 + 0^2 = 1.$$

In this case it can be seen that that the distances are equal. To determine a priority between the two contact events, it will be necessary to consider another parameter such as the frequency of calls to each number.

However, if we apply the weightings discussed above in Equation 3, the distance calculations become $$D4_w = (1)1^2 + (1.2)0^2 + (1)(0)^2 = 1$$

$$D5_w = (1)0^2 + (1.2)1^2 + (1)(0)^2 = 1.2$$

In this instance we can see that the distance to Call 5 is greater than that Call 4. In this way, the contact associated with Call 4 will be higher in the list of recommendations that the contact associated with Call 5.

Weightings may be useful to take into account differences between countries or regions. It will be apparent to the person skilled in the art that the hour parameter is particularly sensitive to weightings as it represents a group of values.

Figure 3:
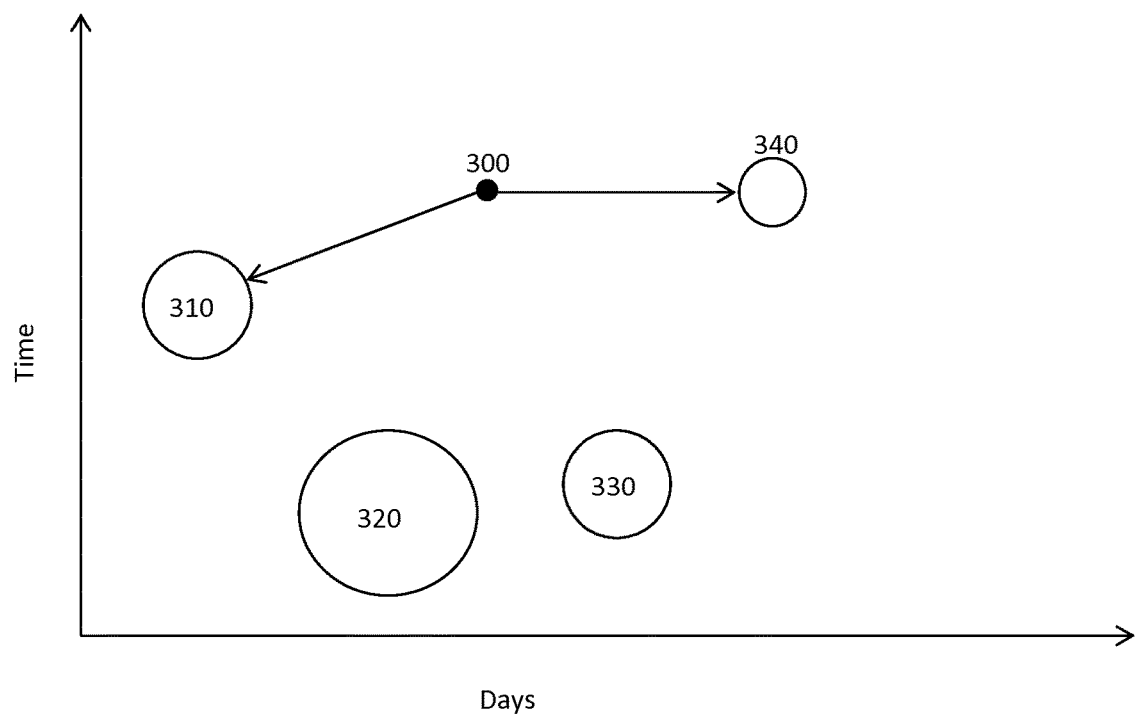
FIG. 3 illustrates how a distance may be determined between a plurality of contact events according to an embodiment of the invention.

FIG. 3 illustrates an exemplary graph of contact events. The contact events are shown distributed upon axes indicative of days of the week and time of day. A current time and day is indicated with reference numeral 300. First to fourth contact events are indicated with reference numerals 310-340, respectively. It can be appreciated that a location of each of the contact events corresponds to a day and time of the contact event. However the contact events are illustrated as being unequally sized. The size of each of the contact events 310-340 is determined in dependence on a number of contact events associated with the respective contact ID. For example, contact event 320 is illustrated as being larger than contact events 310, 330 and 340, corresponding to a greater number of contact events existing corresponding to that telephone number.

In FIG. 3, a distance to contact events 310 and 340 is determined to be equal. However contact event 310 is illustrated larger in size than contact event 340 corresponding to a greater number of contacts or calls to that telephone number associated with contact event 310. In some embodiments contact event 310 is preferential over contact event 340 due to the greater number of contact events to that contact ID or telephone number. That is, in the event of equal distance to a plurality of contact events, a further parameter may be used to resolve the tie between the contact events. The further parameter may be, in some embodiments, a total number of contact events with the respective contact IDs.

In step 130, one or more contact recommendations are generated according to the distance determined in step 120. Step 130 may comprise generating up to a predetermined maximum number of contact recommendations. The maximum number of contact recommendations may be relatively small to avoid providing excessive information, particularly where the recommendations are being provided to a user in a high cognitive load environment, such as a driver of the vehicle. In some embodiments the maximum number is 5, although in other embodiments the maximum number is 3 contact recommendations. The contact recommendations generated in step 130 are those having the smallest distance, as determined in step 120, where in some embodiments a tie in distance between contact events is resolved in favour of a greatest number of contact events as discussed above.

In step 140 the one or more contact recommendations generated in step 130 are output. As noted above, the recommendations may be output visibly and/or audibly by the IO device 240.

Figure 4:
FIG. 4 shows a plurality of contact recommendations according to an embodiment of the invention.

FIG. 4 illustrates an output of a display screen 400 which may form part of the 10 device 240. The display screen 400 comprises a plurality of contact recommendations 410, 420, 430 selected in step 130. As illustrated in FIG. 4, the display screen 400 comprises three contact recommendations although it will be realised that this is merely illustrative and that other numbers of contact recommendations are envisaged, such as five or less. The generation and output of relatively few contact recommendations is useful in high cognitive load environments, such as when the recommendations are being provided to a user who is the driver of a vehicle. As illustrated in FIG. 4, each contact recommendation 410, 420, 430 comprises information identifying the contact, such as the contact ID, e.g. "Maurice Wilks". In some embodiments each contact recommendation may comprise an indication of associated contact information, such as a telephone number, although it will be appreciated that other types of contact information, such as an email address or other identifier, may be displayed. Furthermore, in the exemplary embodiment illustrated in FIG. 4, a control 411, 421, 431 is displayed associated with each contact recommendation 410, 420, 430 allowing contact, such as a call, to be initiated with the respective contact upon activation of the control.

Figure 5:
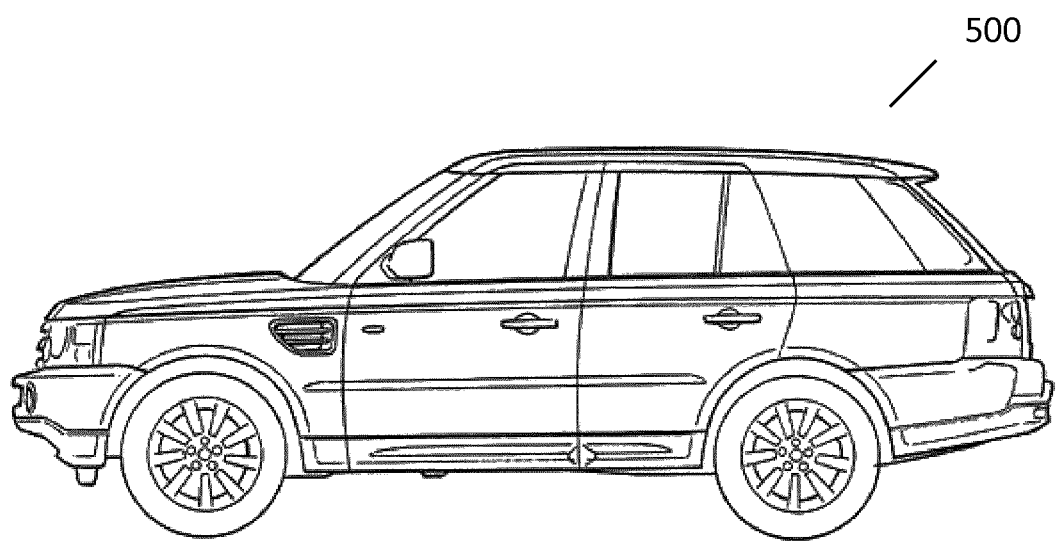
FIG. 5 shows a vehicle according to an embodiment of the invention.

FIG. 5 illustrates a vehicle 500 according to an embodiment of the invention. The vehicle 500 comprises an apparatus 200 as described above, although said apparatus is not visible in the exterior view of FIG. 5. The apparatus 200 may form part of a user-interface of the vehicle 500, such as forming part of an infotainment system of the vehicle 500 which provides communication functions for occupants of the vehicle 500.

Steps 110 to 130 of the method 100 described above with reference to FIG. 1 may be performed during an initialisation or start-up process of the vehicle 500. During the initialisation process, the operation of one or more systems of the vehicle 500 are begun before the vehicle 500 is operational in a state to be driven. During this process, a communication connection with the mobile phone 10 is made and the data indicative of the contact events is received from the mobile phone. As part of the initialisation process, steps 120 and 130 may be performed and data indicative of the one or more contact recommendations may be stored in the memory means 220 of the apparatus 200. Then, in response to a user request to provide contact recommendations, step 140 is performed with reference to the stored data. In this way, a processing overhead of computing the contact recommendations whilst the vehicle 500 is fully operational, such as being driven, is avoided.

Users may fall into either a "stable" user group or "changeable" user group, where the calling patterns of stable users tend not to vary over time while the calling patterns of changeable users do tend to alter over time. The numbers called regularly by a user in the stable user group do not change significantly over time, however the regularly called numbers for a user in the changeable user group may change over time. In the light of this, once the contact events have been obtained, the step of generating the recommendations may be carried out over different data sets each time they are requested. In one example, the recommendations may be carried out over a first subset and a second subset of the determined contact events. The first subset may be the full set of determined contact events. The second subset may relate to a shorter time period, typically that immediately preceding the time of determining the contact events. For example, the second subset may be the contact events for a certain period of time, for example, the preceding three weeks, or may simply be based, for example, on be the previous ten contact events or other predefined number.

Initially, the recommendations from the first subset are presented to the user. However, once the user has made a selection, the user selection is compared to the recommendations based on the first subset and the recommendations based on the second sub-set. Periodically, the accuracy of each recommendation type is compared. After the accuracy comparison, if the results over the second subset prove more accurate, the method will switch to outputting those recommendations.

Recommendations for both subsets may continue to be generated, with the outputted recommendations changing as the periodic accuracy analysis indicates.

It will be appreciated that a vehicle may be shared between a plurality of users, each of whom may drive the vehicle at different times. Certain embodiments of the invention provide for a user profile for each user to be defined within the communication apparatus 200. As such, the data indicative of the contact events that the communication apparatus obtains, in step 110, from the user mobile device 10 is associated with the user's profile when stored on the communication apparatus 200. Sometimes, however, a user may have more than one mobile device, for example a personal mobile device and a work mobile device. In such cases, the user may choose to associate all of their mobile devices with their profile. When making a call, the apparatus 200 may prompt the user to select which mobile device to use. In this way, the communication apparatus 200 may obtain data indicative of contact events from all mobile devices associated with the profile, and present in the vehicle. The communication apparatus 200 may store each contact event with a tag identifying the mobile device from which the contact event was obtained.

When carrying out the steps of determining 120 the distance to contact events and generating 130 recommendations, the communication apparatus 200 may automatically select the data from one mobile device on which to base recommendations; may prompt the user to select which mobile device to use for recommendations; or may merge the data indicative of contact events from both mobile devices and base the analysis on the merged data. Where the user makes a selection, they may choose more than one mobile device wherein the communication apparatus 200 will merge the data from the selected devices.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer-implemented method of generating contact recommendations for a vehicle communication apparatus, the method suitable for use in a high cognitive load environment, the method comprising:
   determining a plurality of vehicle contact events associated with a communication device, wherein vehicle contact events are contact events that were executed via the vehicle communication apparatus;
   determining a distance between one or more current parameters and one or more respective parameters associated with each of the plurality of vehicle contact events, wherein the determined distance is based on a sum-squared difference between the one or more current parameters and the of one or more respective parameters associated with each of the plurality of vehicle contact events; and
   generating one or more contact recommendations according to the determined distance.

2. The method of claim 1, further comprising determining a value associated with each of the current parameters and the parameters associated with each of the vehicle contact events, wherein the value is determined by allocating the respective parameter to one or more groups.

3. The method of claim 2, wherein the groups consist of a first group relating to days of the week and a second group relating to time of day.

4. The method of claim 2, wherein the distance is calculated according to the following expressions:

if $abs(x-y) \leq max\_distance$, then $distance = abs(x-y)$;
   and if $abs(x-y) > max\_distance$, then $distance = n - abs(x-y)$;

where x is a first parameter value for a first event, y is the first parameter value for a second event, n is the total number of groups for the first parameter, the abs( ) function returns the absolute value, and where max_distance is the maximum permitted distance between event parameters being defined by the following equation:

$max\_distance = Floor(max\_difference/2)$ where max_difference is the difference between the largest possible value of group numeric value and smallest possible value of group numeric value, and the Floor( ) function returns the least succeeding integer.

5. The method of claim 1, wherein the distance is determined as:

$$D=(Day_{current}-Day_{event})^2+(Time_{current}-Time_{event})^2$$

wherein D is the distance, $Day_{current}$ is a current day, $Day_{event}$ is a day of a vehicle contact event, $Time_{current}$ is a current time of day, $Time_{event}$ is a time of a vehicle contact event.

6. The method of claim 1, wherein generating contact recommendations comprises generating up to a predetermined number of contact recommendations.

7. The method of claim 1, further comprising selecting a vehicle contact event from amongst a plurality of vehicle contact events having substantially equal distance based on a discriminating parameter associated with the respective vehicle contact events.

8. The method of claim 1, wherein generating one or more contact recommendations comprises: generating a first set of vehicle contact recommendations based on a first subset of the determined vehicle contact events and a second set of contact recommendations based on a second subset of vehicle contact events; and comparing the first and second set of contact recommendations.

9. The method of claim 8, wherein the first subset comprises all of the determined vehicle contact events and the second subset comprises only recent determined vehicle contact events.

10. A computer-implemented method of generating contact recommendations for a vehicle communication apparatus, the method suitable for use in a high cognitive load environment, the method comprising:
  determining a plurality of vehicle contact events associated with a communication device, wherein vehicle contact events are contact events that were executed via the vehicle communication apparatus;
  determining a distance between one or more current parameters and one or more respective parameters associated with each of the plurality of vehicle contact events, wherein the determined distance is based on a weighted combination of the one or more current parameters and the one or more respective parameters associated with each of the plurality of vehicle contact events; and
  generating one or more contact recommendations according to the determined distance.

11. A vehicle communication apparatus, suitable for use in a high cognitive load environment and comprising:
  a memory device for operably storing data indicative of a plurality of vehicle contact events, wherein vehicle contact events are those executed via the vehicle communication apparatus;
  a control device; and
  an output device;
  wherein the control device is arranged to:
    determine a distance between one or more current parameters and one or more respective parameters associated with each of the vehicle contact events, wherein the determined distance is based on a sum-squared difference between the one or more current parameters and the one or more respective parameters associated with each of the plurality of vehicle contact events; and
    generate contact recommendations according to the determined distance and to output the recommendations via the output device to a user.

12. The vehicle communication apparatus of claim 11, wherein the control device is further arranged to determine a value associated with each of the current parameters and the parameters associated with each of the vehicle contact events, wherein the value is determined by allocating the respective parameter to one or more groups, and wherein each of the groups corresponds to one or more parameter values.

13. The vehicle communication apparatus of claim 12, wherein the group for at least some of the parameters corresponds to one or more days of the week.

14. The vehicle communication apparatus of claim 11, further comprising a communication unit for wireless communication with a mobile device, wherein the data indicative of the plurality of vehicle contact events is received from the mobile device.

15. A vehicle comprising the vehicle communication apparatus according to claim 11.

16. A non-transitory, computer-readable storage medium storing instructions thereon that, when executed by one or more electronic processors, causes the one or more electronic processors to perform the method of claim 1.

17. A non-transitory, computer-readable storage medium storing instructions thereon that, when executed by one or more electronic processors, causes the one or more electronic processors to perform the method of claim 10.

18. A vehicle communication apparatus, suitable for use in a high cognitive load environment and comprising:
  a memory device for operably storing data indicative of a plurality of vehicle contact events, wherein vehicle contact events are those executed via the vehicle communication apparatus;
  a control device; and
  an output device;
  wherein the control device is arranged to:
    determine a distance between one or more current parameters and one or more respective parameters associated with each of the vehicle contact events, wherein the determined distance is based on a weighted combination of the one or more current parameters and the one or more respective parameters associated with each of the plurality of vehicle contact events; and
    generate contact recommendations according to the determined distance and to output the recommendations via the output device to a user.

19. A vehicle comprising the vehicle communication apparatus according to claim 18.

* * * * *